United States Patent
Bell, Jr. et al.

(10) Patent No.: US 6,188,078 B1
(45) Date of Patent: Feb. 13, 2001

(54) OPTICAL METROLOGY DEVICE FOR PRECISION ANGULAR MEASUREMENT OF A POINTING MIRROR

(75) Inventors: Raymond Mack Bell, Jr., Redwood City; Patrick E. Perkins, Sunnyvale; David Mark Stubbs, Mountain View, all of CA (US)

(73) Assignee: Lockheed Martin Missiles & Space Company, Sunnyvale, CA (US)

( * ) Notice: Under 35 U.S.C. 154(b), the term of this patent shall be extended for 0 days.

(21) Appl. No.: 09/304,638

(22) Filed: May 4, 1999

(51) Int. Cl.[7] ........................................... G01N 21/86
(52) U.S. Cl. ..................... 250/559.1; 250/216; 250/234
(58) Field of Search .................................. 250/559.1, 216, 250/234, 559.11, 223 B, 235, 236, 559.29, 559.3; 358/474, 481; 359/212–219; 235/462.32, 462.36, 462.4

(56) References Cited

U.S. PATENT DOCUMENTS

| | | | |
|---|---|---|---|
| 5,671,359 | 9/1997 | Godlewski et al. | 395/203 |
| 5,778,016 | 7/1998 | Sucha et al. | 372/38 |
| 5,821,526 | 10/1998 | Krishna | 250/203.6 |
| 5,841,574 | 11/1998 | Willey | 359/351 |
| 5,864,132 | * 1/1999 | Holcombe | 250/216 |

* cited by examiner

Primary Examiner—Que T. Le
(74) Attorney, Agent, or Firm—Swidler Berlin Shereff Friedman, LLP (57) ABSTRACT

A method and apparatus measure the accuracy of and optically calibrate a scan mirror. Both the method and apparatus may operate over a wide range of environmental conditions. The environmental conditions may include variations in pressure from a vacuum to several atmospheres. Similarly, large variations in temperature may be accommodated. The apparatus includes a laser source, a plurality of facet mirrors and a detector. The laser source projects a beam onto a reflective surface of a rotatable scan mirror, which directs the beam to each of the plurality of facet mirrors. Each facet mirror is positioned at a known angle. Each facet mirror in turn reflects the beam from the reflective surface of the scan mirror substantially back onto itself (autocollimation). The angle detector then receives the reflected beam and measures a value related to a return angle of the beam.

20 Claims, 8 Drawing Sheets

OPTICAL METROLOGY DEVICE FOR PRECISION ANGULAR MEASUREMENT OF A POINTING MIRROR

FIELD OF THE INVENTION

The present invention relates to calibration of optical instruments. In particular, the present invention relates to calibration of a reflecting optical device, such as a pointing mirror, using an optical calibration apparatus. The calibration apparatus includes a light source for projecting a beam of light at the reflecting optical device, a plurality of facet mirrors pointed at predetermined angles, and a detector for indicating a properly registered beam. The reflecting optical device steers the beam at the facet mirrors during calibration.

BACKGROUND OF THE INVENTION

Many monitoring, measuring and input devices utilize scan mirrors to optically scan a field of view. For example, weather satellites, such as the GOES satellite, incorporate scan mirrors for scanning weather patterns over earth. In the GOES satellite, the scan mirror reflects to a detector light received from a portion of the atmosphere at which the mirror is directed. The precise pointing direction of the scan mirror is important, as the detected radiation represents atmospheric data, such as cloud and precipitation data, collected from a precise portion of the earth's atmosphere. This pointing direction is then used to correlate the atmospheric data collected with the underlying geography of the earth for depiction of weather conditions on weather maps. Other instruments which may have scan mirrors include semiconductor wafer scanners and photocopying machines. In each of these applications, it is necessary to accurately track and control the position of the scan mirror.

In the case of satellite and semiconductor wafer scanning mirrors, the scan mirror may operate in a vacuum and under extremes of temperature. In the case of a scan mirror located in a photocopying machine, the scan mirror may be subject to large temperature fluctuations when the photocopier goes from a resting state to a state of continuous copying.

The characteristics of the scan mirror may change over temperature and pressure extremes. Therefore, it is desirable to have a device to measure the accuracy of and calibrate a scan mirror over a wide range of temperatures and pressures. It would further be desirable to have a device for measuring scan mirror angles with high accuracy, which itself requires setup and manual manipulation only one time.

Prior art devices, such as theodolites, exist for measuring angles. However, theodolites are limited in their angle measuring accuracy.

SUMMARY OF THE INVENTION

According to the present invention, a method and apparatus measure the accuracy of and optionally calibrate a scan mirror. Both the method and apparatus may operate over a wide range of environmental conditions. The environmental conditions may include variations in pressure from a vacuum to several atmospheres. Similarly, large variations in temperature may be accommodated.

According to the method, in a projecting step, a laser beam is projected at a scan mirror. Then, in a commanding step, the scan mirror is commanded to reflect the laser beam successively at a first and a second facet mirror, where the first and second facet mirrors have known angles of reflection. In a reflecting step, the laser beam is reflected substantially back onto itself by each facet mirror. Then, in a determining step, an angle between the first and the second facet mirrors is determined at the scan mirror. Then an error is calculated in a calculating step, based on the determined angle and the known angles.

Prior to the projecting step, an offset of the laser beam may be measured and used in the error calculation. Also, the commanding step may include commanding the scan mirror to move until the reflected laser beam is centered. This occurs when a null or near null value is detected by a detector receiving the reflected laser beam.

The apparatus includes a laser source, a plurality of facet mirrors and a detector. The laser source projects a beam onto a reflective surface of a rotatable scan mirror, which directs the beam to each of the plurality of facet mirrors. Each facet mirror is positioned at a known angle. Each facet mirror in turn reflects the beam from the reflective surface of the scan mirror substantially back onto itself (autocollimation). The angle detector then receives the reflected beam and measures a value related to a return angle of the beam.

The apparatus may further include a processor, coupled to the angle detector and the scan mirror. The processor may command the scan mirror to point the beam at a predetermined facet and may command the scan mirror to move until the angle detector reads a null or near null value. The optical instrument under test typically includes an encoder coupled to the scan mirror for measuring position values corresponding to positions of the scan mirror. The position values may be used to determine angles for comparison with the known angles of the facet mirrors.

To achieve environmental stability, the laser source, facet mirrors and the detector are typically mounted to a housing made of a material with a low coefficient of thermal expansion, such as Invar. Moreover, the facet mirrors in a preferred embodiment are mounted to the housing using a three ball kinematic mount. The three ball mounting technique permits precise angular positioning of each facet mirror, even under relatively lax manufacturing tolerances of each facet mirror and the housing itself.

DETAILED DESCRIPTION

Figure 1:
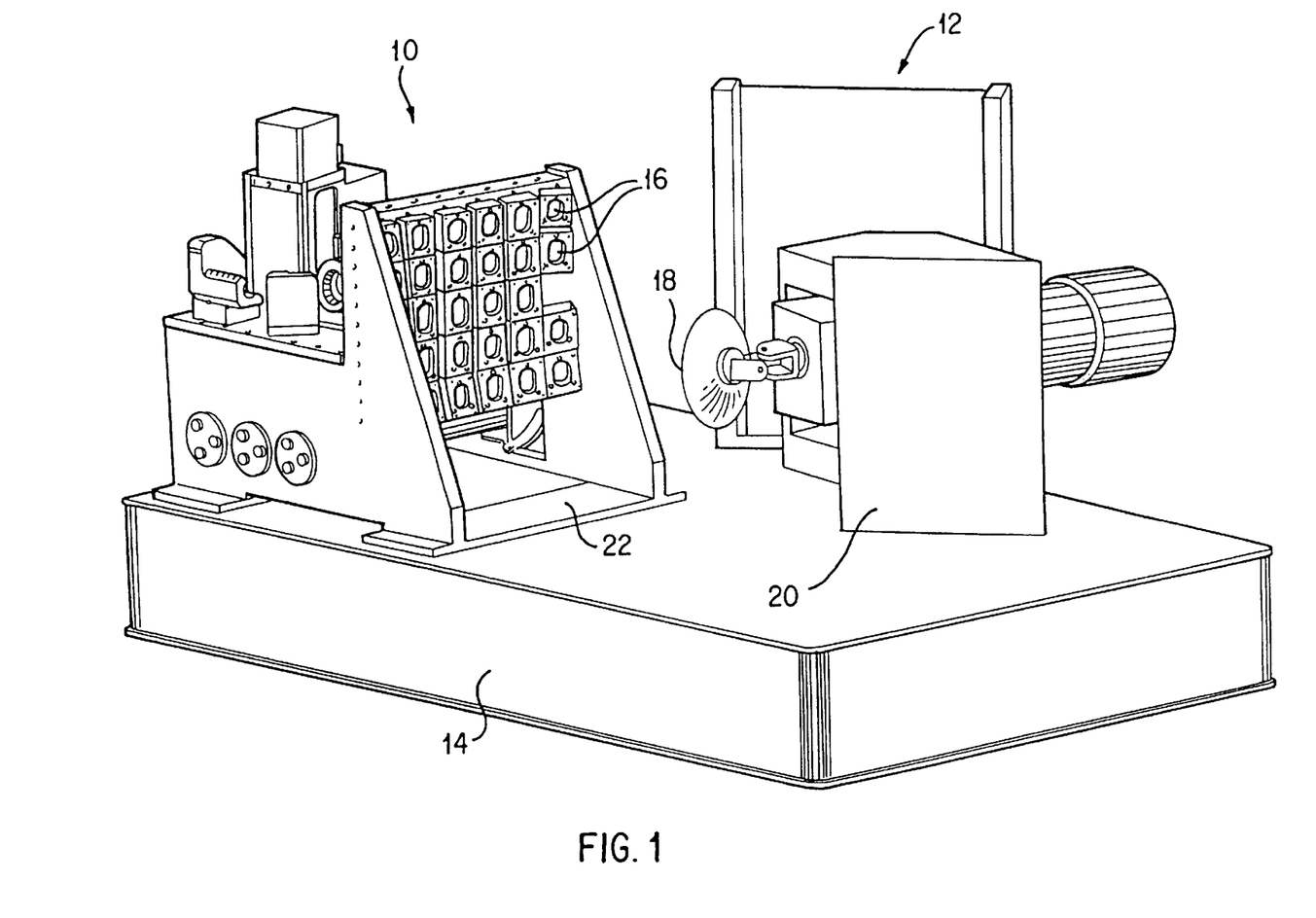
FIG. 1 depicts a metrology device and a scan mirror mounted to a common optical table, according to the present invention.

FIG. 1 depicts a metrology device 10 which is used to calibrate and test and an optical instrument 12 according to the present invention. The metrology device 10 includes a housing 22 which is mounted to an optical table 14. The housing 22 may be mounted to the optical table 14 using bolts, screws, fasteners, adhesive or any other fastening technique. The housing 22 is preferably made of a single or a composite material with a low coefficient of thermal expansion. In a preferred embodiment of the invention, the material is Invar. However, the material chosen for the housing 22 may be any suitable material based on the conditions to be applied during testing of the optical instrument 12. For example, if the optical instrument 12 is not to be tested over a wide temperature range, then the housing 22 need not be made of a material with a low coefficient of thermal expansion.

Referring again to FIG. 1, the metrology device 10 includes a plurality of facet mirrors 16. The facet mirrors are arranged so that each facet mirror 16 presents a reflective surface to the optical instrument 12 at a known angle. The mounting of the facet mirrors 16, and angles chosen for the facet mirrors 16, will be explained in more detail below.

Figure 2:
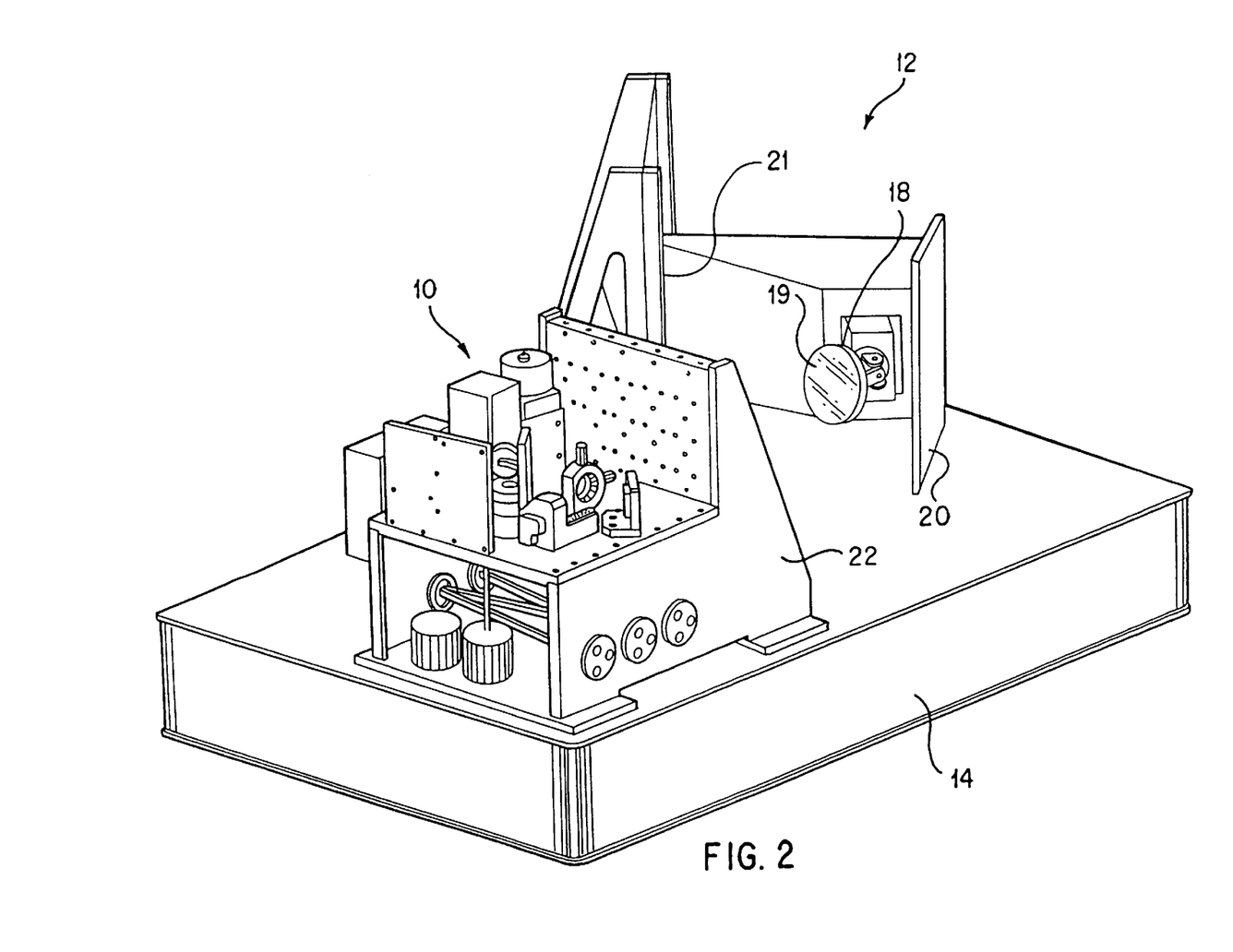
FIG. 2 depicts the metrology device and the scan mirror of FIG. 1 from a vantage point which illustrates a position of the scan mirror relative to the metrology device, according to the present invention.

In the embodiment depicted in FIGS. 1 and 2, the optical instrument 12 includes a housing 20 which is mounted to the optical table 14. The housing 20 may be mounted in any convenient fashion, including bolts, screws, fasteners, adhesives or any other convenient technique. A pointing or scanning mirror 18 is rotatably mounted to the housing 20, typically permitting the mirror 18 to pivot about one or two axes. The mirror may be mounted, for example, using a gimbal, thus permitting two axis rotation of the mirror relative to the housing. The pivot point may be a point on the mirror surface, or may be a point off of the mirror surface.

FIG. 2 depicts the metrology device 10 and the optical instrument 12 from a vantage point which illustrates the housing 20 and, a reflecting surface 19 of the pointing mirror 18. As shown, the housing 12 includes a substantially open face 21, which may either be open or light transmissive, and a substantially hollow interior between the reflecting surface 19 of the mirror 18 and the open face 21. The open face 21 and the hollow interior permit light to enter through the open face 21, reflect off of the reflecting surface 19 of the mirror 18, and exit again the open face 21. The hollow interior also permits rotation of the pointing mirror 18. It will be understood, however, that the configuration of the optical instrument 12 is not important as long as a laser beam can be projected from the metrology device 10 at a reflecting surface 19 of the pointing mirror 18. For example, the optical instrument 12 may have the pointing mirror 18 mounted on the exterior of the housing 20. Moreover, the optical instrument 12 may include additional optics, such as lenses and mirrors, between the reflecting surface 19 and the metrology device 10.

Figure 3:
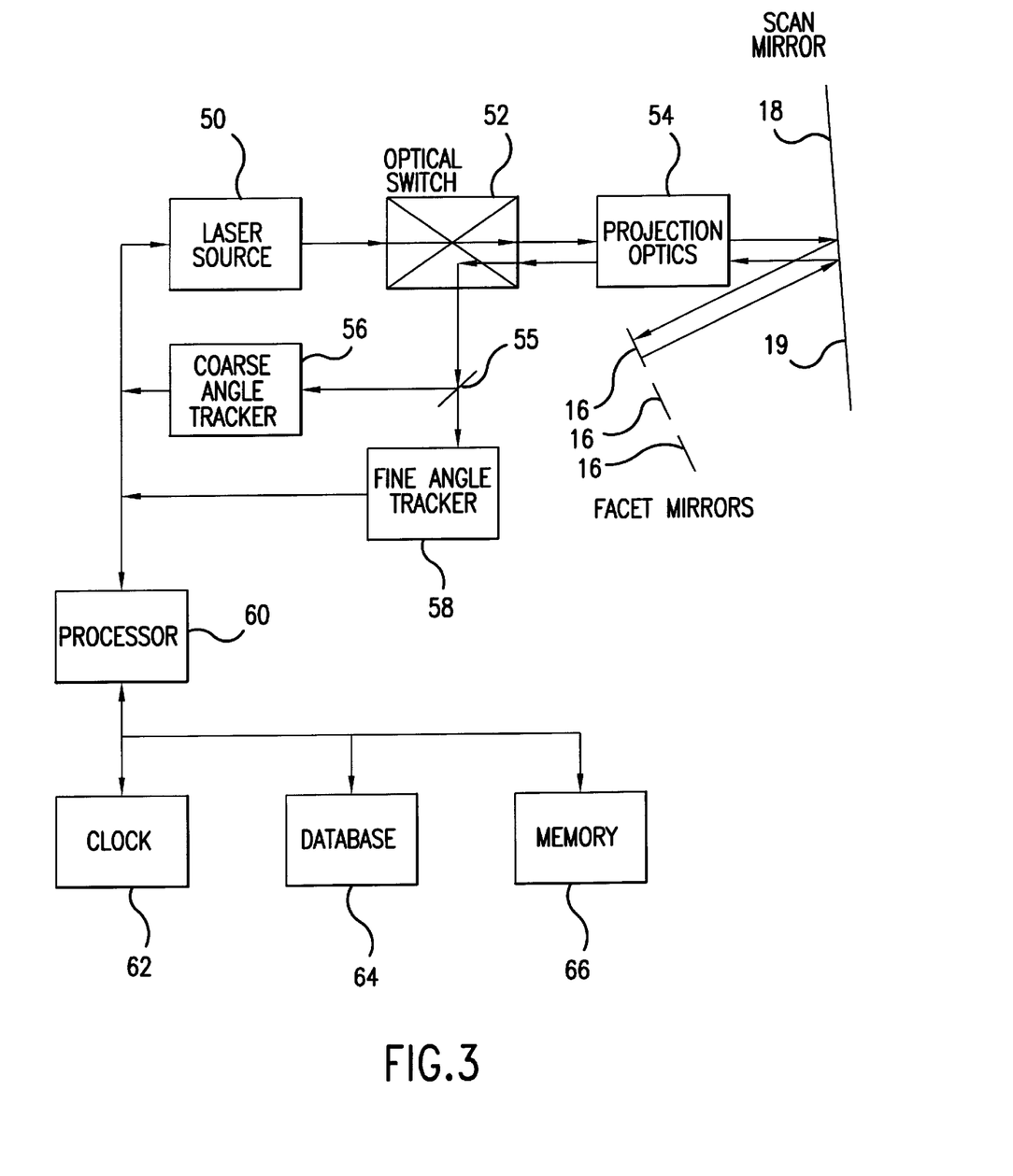
FIG. 3 depicts an internal block diagram of the metrology device, according to the present invention.

FIG. 3 depicts a block diagram of optical and electronic instruments within the metrology device 10. The metrology device 10 includes a laser source 50, an optical switch 52, projection optics 54, facet mirrors 16, a beam splitter 55, a course angle tracker 56 and a fine angle tracker 58. The metrology device 10 further includes a processor 60 which is coupled over a bus to a clock 62, a database 64 and a memory 66.

The laser source 50 projects a beam toward the optical switch 52. The optical switch 52, under control of the processor 60, either transmits the beam to the projection optics 54 or toward the beam splitter 55. in the latter scenario, the beam from the laser source 50 travels directly through the optical switch 52 to the coarse angular tracker 56 and the fine angular tracker 58.

The coarse and fine angular trackers 56 and 58 are typically charge coupled devices (CCD) which include an array of optical detectors. When the beam hits the coarse angular tracker 56, the course angular tracker 56 produces a value indicative of a location of the beam within the array. This value is provided to the processor 60. The fine angle tracker 58 is also typically a CCD, and sends a value to the processor 60 indicative of a location of an incident beam. Other detectors such as quadrant photo diodes or lateral diffuse detectors may be used in place of CCDS.

Laser beams projected from a laser source have a tendency to drift over time, therefore, diverting the beam from the optical switch 52 directly to the coarse and fine angle trackers 56 and 58, respectively, affords the opportunity to determine an offset of the beam prior to making any measurements of the optical instrument 12. The offset value may be used to correct measurements taken during calibration.

During calibration, the processor 60 signals the optical switch 52 to transmit the beam. The optical switch 52 thus allows the beam to pass from the laser source 50 to the projection optics 54. The projection optics 54 may be used to steer or inactively focus the beam on the reflecting surface 19 of the pointing mirror 18. The beam projects from the projection optics 54 onto the reflective surface 19 of the pointing mirror 18. The beam then reflects off of the reflective surface 19 in the direction of the array of facet mirrors 16. The scan mirror 18 may be manually positioned to reflect at one of the facet mirrors 16.

Alternatively, the scan mirror 18 may be commanded, via a calibration profile, to point at one of the facet mirrors 16, either by a program running on a processor within the optical device 12 or by the processor 60 of the metrology device. When the pointing mirror 18 directs the beam onto a reflective surface of one of the facet mirrors, the beam returns on itself (autocollimated) and is reflected back through the projection optics 54 to the optical switch 52. The optical switch 52 diverts the beam to the beam splitter 55. The beam splitter 55 in turn directs portions of the beam to both the coarse angle tracker 56 and the fine angular tracker 58.

In order to properly configure the metrology device 10 for calibration of an optical instrument 12, it is important to properly configure and know the angle of a reflecting surface of each facet mirror 16. The angle remains substantially constant over a wide range of temperature when materials having a low coefficient of thermal expansion are used. For example, in a preferred embodiment of the invention, the beam is projected onto the reflecting surface of the mirror 19 which reflects the beam to a facet mirror 16. The facet mirror 16 in turn reflects the beam substantially back onto itself and the reflecting surface 19. Subsequently, the reflected beam re-enters the metrology device 10 through the projection optics and is substantially co-located with the incident beam.

In order for the incident and reflected beams to be substantially co-located, each facet mirror should have its reflecting surface angled substantially perpendicular to the incident beam after its reflection from the reflecting surface 19 of the scan mirror 18. Therefore, in a preferred embodiment of the invention, the facet mirrors 16 are mounted to achieve perpendicularity given knowledge of an angle defined by the beam, a point of intersection between the beam and the reflecting surface 19, and a point, typically the center, on each facet mirror 16. In a preferred embodiment of the invention, the facet mirrors 16 are mounted to the housing 22 using a three ball mount as shown in FIG. 4.

Figure 4A:
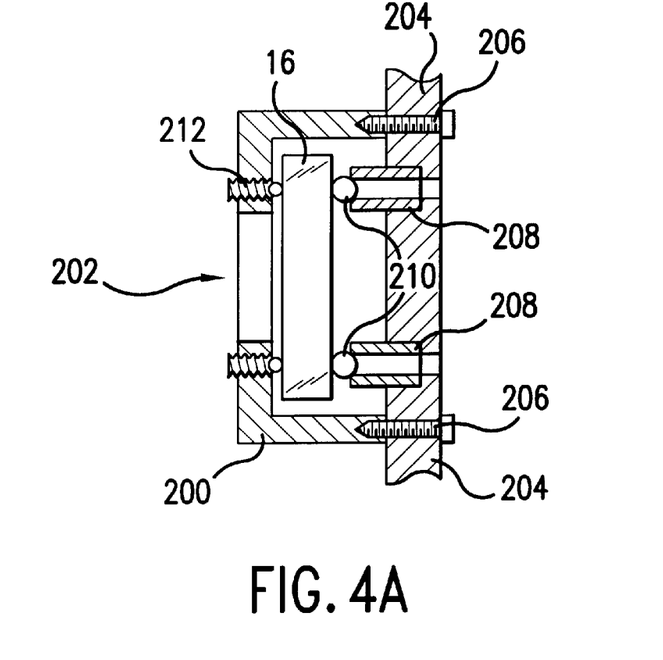
FIG. 4 depicts a view of a facet mirror which illustrates three ball kinematic mounting of the facet mirror.
Figure 4B:
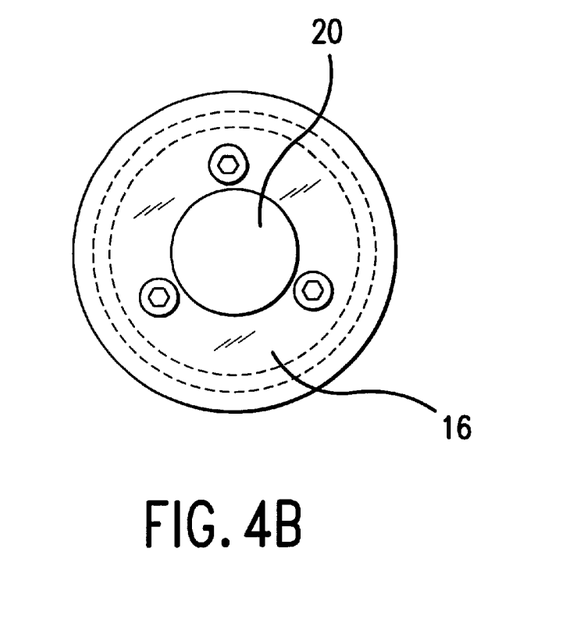

FIG. 4 depicts an illustration of a three ball mount of a facet mirror 16. Referring to FIG. 4, a retainer 200 is mounted to a back plate 204. The back plate 204 may be a face of the housing 22 of the metrology device 10 or it may be a separate plate mounted to the housing 22. The retainer 200 is mounted to the back plate 204 using the mount screws 206. The retainer 200 itself includes a clear aperture 202 through which incident light may pass en-route to a reflecting surface of the mirror 16 as well as receptacles for three spring plungers 212.

Mounted to the back plate 204 are three ball posts 208. Each ball post 208 may be mounted at a proximal end into a receiving counterbored hole of the backplate 204. Alternatively, the ball posts 208 may be mounted using screws, bolts, rivets, adhesive or any other conventional mounting technique. Each ball post 208 may include a central bore at a distal end of which rests a ball 210. To achieve a desired angle of the facet mirror, the ball posts 208 may have varying lengths. During mounting, the non-reflecting face of the mirror 16 is positioned against the three balls 210 on the ball posts 208. The retainer 200 is then placed over the mirror 16 and mounted to the back plate 204 using the mount screws 206. The plungers 212 are then turned until their balls come into contact with mirror 16. An additional rotation of the plunger 15 is performed to achieve pre-loading sufficient to disallow motion of mirror 16. The mirror 16 is thus held into place at three pressure points between the three balls 210 and the three plungers 212.

The three ball mount is advantageous in that it permits manufacturing tolerances of the housing 22 and the facet mirrors 16 to be lax while nonetheless permitting stable angular positioning of the facet mirrors 16. Alternatives to three ball mounting include mounting the facet mirrors using flexures, adhesives and other conventional techniques such as by using screws, bolts, and rivets. Any of these techniques may be used. However, none of these techniques is as thermally stable or deterministic as the preferred three ball mount.

Referring again to FIG. 3, the metrology device 10 is controlled by the processor 60. The processor 60 is coupled over a bus to the clock 62, the database 64, the memory 66, the laser source 50, the optical switch 52, and the coarse and fine angle trackers 56 and 58, respectively.

The memory 66 stores program instructions which determine how the metrology device 10 operates. The memory 66 may include random access memory (RAM), read only memory (ROM), and other storage devices which read or write data from and to electronic media, such as disk drives equipped with hard or floppy disks and CD ROM drives equipped with CD ROMs. The program instructions may be stored on electronic media and then uploaded to memory for execution by the processor 60. The database 64 is shown separately from the memory 66 but may be part of the memory 66. Alternatively, the database 64 may be remotely located on a network and may include program instructions which are uploaded to memory. The database 64 further provides a storage facility for storing data collected during calibration.

The processor 60 executes the program instructions stored in the memory 66 to accomplish the calibration. Based on the program instructions, the processor 60 controls the operation of the laser source 50, the optical switch 52, and the course and fine angle trackers 56 and 58. The processor 60 also retrieves data from the coarse and fine angle trackers 56 and 58 and the clock 62 during calibration and stores the values as test data in the database 64. The test data stored in the database 64 may be tabulated and, for example, include time, facet #, angle, coarse angle reading, fine angle reading, and laser offset fields. This is illustrated in the table below:

TABLE #1

Test Data Stored in Metrology Device

| Elapsed Time | Facet # | Angle | CAR | FAR | Laser Offset |
|---|---|---|---|---|---|
| 20.00s | 1 | 20 deg | 0.1 | 0.02 | 0.01 |
| 40.00s | 2 | 30 deg | 0.1 | 0.05 | 0.01 |
| 40.15s | 3 | 40 deg | 0.1 | 0.09 | 0.01 |
| 40.30s | 4 | 50 deg | 0.1 | 0.07 | 0.01 |

Figure 5:
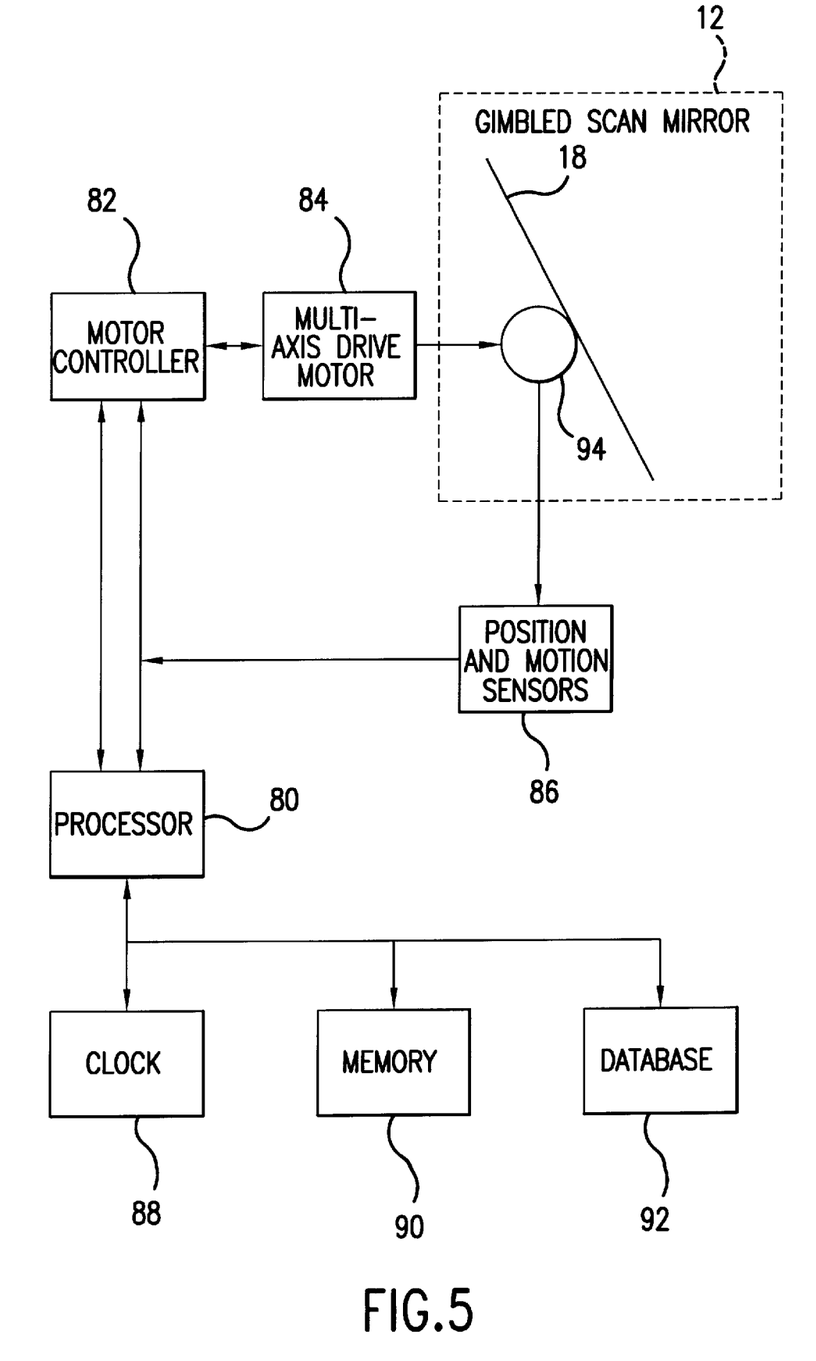
FIG. 5 depicts an internal block diagram of a device incorporating a scan mirror, according to the present invention.

FIG. 5 depicts an internal block diagram of the optical instrument 12. The optical instrument 12 includes a pointing mirror 18, mounted to a gimbal 94 which in turn may be mounted to the housing 20. The optical instrument 12 further includes a motor controller 82, a multi-axis drive motor 84, position and motion sensors 86, a processor 80, a clock 88, a memory 90 and a database 92. The memory 90 stores program instructions for execution by the processor 80, which controls the operation of the optical instrument 12. The memory 80 may include random access memory (RAM), read only memory (ROM), and other storage devices which read or write data from and to electronic media, such as disk drives equipped with hard or floppy disks and CD ROM drives equipped with CD ROMs. The program instructions may be stored on electronic media and then uploaded to memory for execution by the processor 60.

The database 92 stores data related to calibration of the optical instrument. For example, the database 92 may store one or more calibration profiles for testing the optical instrument 12. Each calibration profile specifies the movements that the pointing mirror 18 makes during calibration testing and may illustratively include the following fields: time, facet #, a position value specifying a pointing angle for the mirror 18 to point at a particular facet, as well as acceleration, velocity, and deceleration fields. This is illustratively depicted in the table below.

TABLE #2

Calibration Profile

| Elapsed Time | Facet # | Position value | Accel. | Max. Velocity | Decel. |
|---|---|---|---|---|---|
| 20.00s | 1 | 20 deg | 1 m/s$^2$ | 3 m/s | 1 m/s$^2$ |
| 40.00s | 2 | 30 deg | 1 m/s$^2$ | 3 m/s | 1 m/s$^2$ |
| 40.15s | 3 | 40 deg | 2 m/s$^2$ | 3 m/s | 2 m/s$^2$ |
| 40.30s | 4 | 50 deg | 2 m/s$^2$ | 3 m/s | 2 m/s$^2$ |

The database 92 may also store program instructions. The database 92 may be part of the memory 90 or may be located on a network which is coupled to the processor 80.

The processor 80 reads program instructions from the memory 90 and a calibration profile from the database 92 and in response issues commands to the motor controller 82 to move the pointing mirror 18 to specified positions, optionally at specified velocities, accelerations and decelerations. The motor controller 82, in response, energizes windings within the multi-axis drive motor 84 in a well-known manner to move the pointing mirror 18 in the commanded direction. The position and motion sensors 86 may include an encoder for outputting a position of the scan mirror, as well as optional velocity and acceleration measuring devices. The position and motion sensors 86 provide position and optional velocity and acceleration parameters to the processor 80 and the motor controller 82. The processor 80 or motor controller 82 may utilize the output of the position and motion sensors as feed back to control the energy applied to the windings of the motor 84 in any of several well-known manners.

The measured position and optional velocity and acceleration parameters may be tabulated and stored in the database 92 as measurement data. The measurement data may include elapsed time, facet #, angular position, velocity, acceleration and deceleration for multiple measurements as illustratively depicted in the table below:

TABLE #3

Optical Instrument Measurement Data

| Elapsed Time | Facet # | Position value | Accel. | Max. Velocity | Decel. |
|---|---|---|---|---|---|
| 20.00s | 1 | 20.05 deg | 1.1 m/s$^2$ | 2.4 m/s | 0.9 m/s$^2$ |
| 40.00s | 2 | 29.89 deg | 1.1 m/s$^2$ | 2.5 m/s | 0.9 m/s$^2$ |
| 40.15s | 3 | 39.95 deg | 2.1 m/s$^2$ | 3.8 m/s | 2.0 m/s$^2$ |
| 40.30s | 4 | 50.02 deg | 2.0 m/s$^2$ | 3.9 m/s | 1.9 m/s$^2$ |

The clock 88 keeps track of time or elapsed time during a calibration test. For high-speed, dynamic testing of the scan mirror 18, the clock 88 is either the same as or synchronized to the clock 62.

Figure 6:
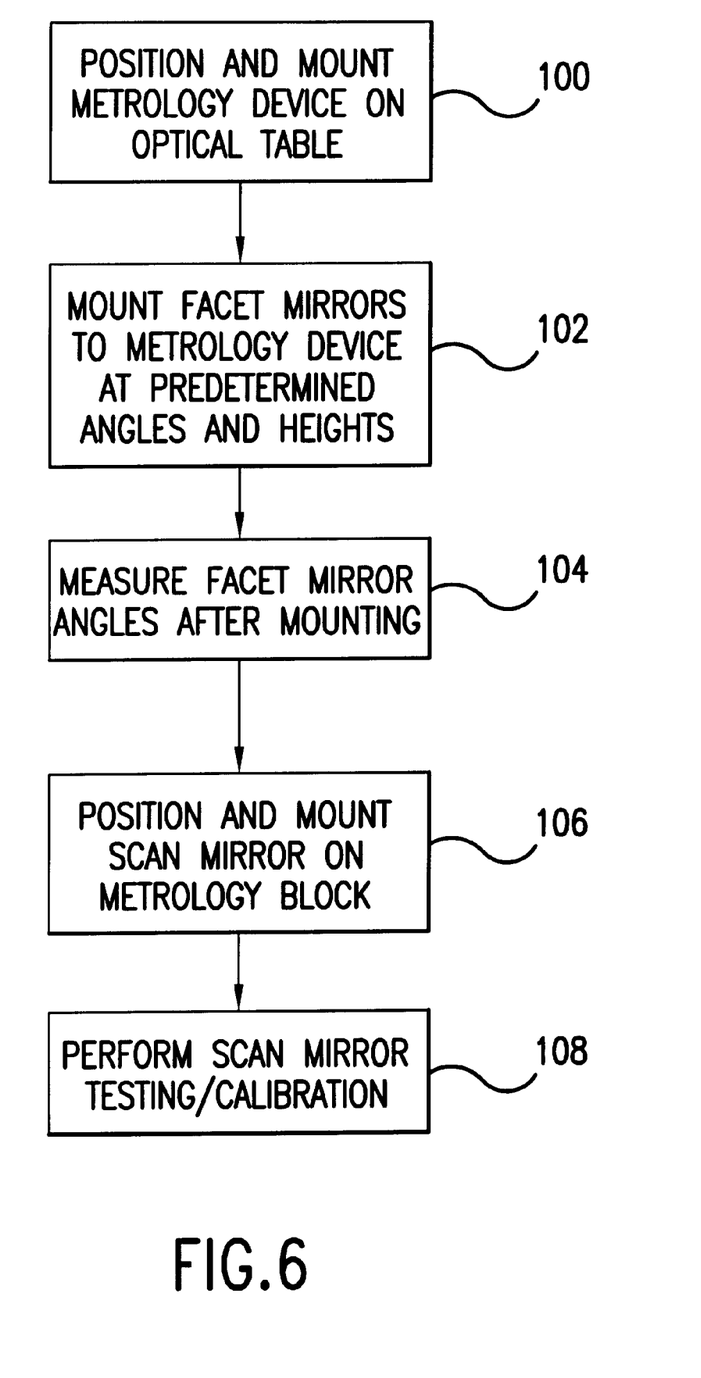
FIG. 6 depicts a method of calibrating a metrology device, according to the present invention.

FIG. 6 depicts a method of initially calibrating the metrology device 10 for subsequent use in calibrating an optical instrument 12. In step 100, the metrology device 10 is positioned and mounted on a optical table. In step 102, the facet mirrors 16 are mounted on the housing 22. In a preferred embodiment of the invention, the facet mirrors 16 are mounted on three ball mounts which predetermine the angular locations. In step 104, the facet mirror angles are measured. Precise angular positioning of the facet mirrors 16 is possible with the assistance of a measuring device, such as a theodolite.

In step 106, the optical instrument 12 is mounted on the optical table 14. According to the present invention, it is not necessary that the optical instrument be precisely mounted to the optical table 14 when an angular difference between beams directed at different facet mirrors 16 is used for calibration and accuracy measurement.

In step 108, testing and calibration of the pointing mirror 18 is performed. In the preferred embodiment of the invention, the metrology device and the optical table are made of a temperature stable material, such as Invar. In the preferred embodiment, therefore, the facet mirror angles do not change with temperature or pressure. Therefore, testing of the optical device 10 may be done over a wide temperature and pressure range, without adjusting the placement of the facet mirrors 16. This facilitates testing of optical instruments which are used in varying environmental conditions, such as space or a semiconductor processing apparatus.

Figure 7A:
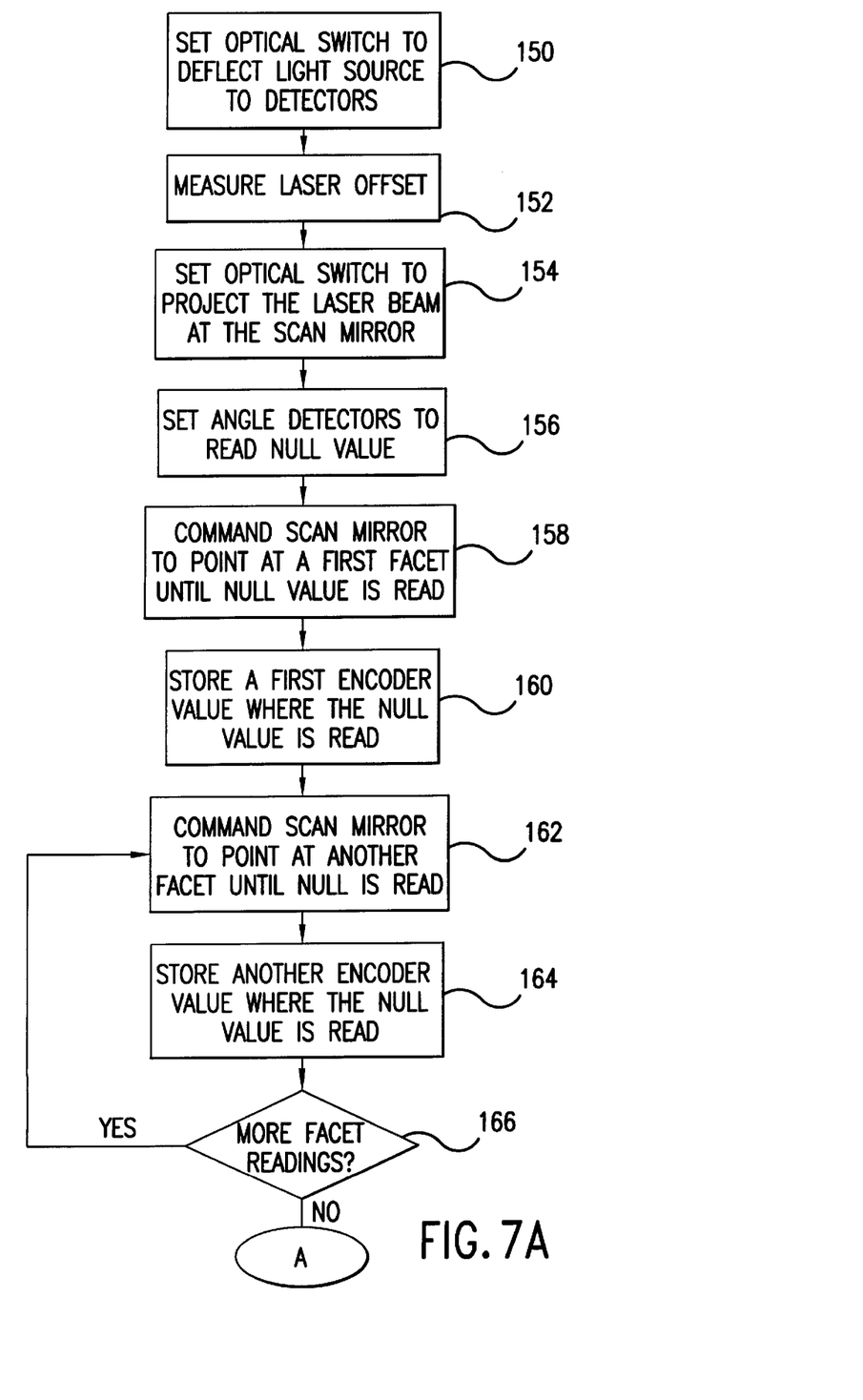
FIG. 7A and 7B depict a method of calibrating a scan mirror according to the present invention.

FIG. 7A illustratively depicts a method of calibrating an optical instrument using the metrology device 20. In step 150, the processor 60 sets the optical switch 52 to deflect a beam issuing from the laser source to the angular detectors 56 and 58. In step 152, the processor 60 measures and stores an offset associated with the beam. In step 154, the processor 60 signals the optical switch to project the beam onto the reflecting surface 19 of the pointing mirror 18. In step 156, the processor sets the angle detectors 56 and 58 to indicate when a null or near null value is read. The null or near null value corresponds to a particular position on both the coarse and fine angular trackers 56 and 58.

In step 158, the scan mirror 18 is commanded to point at a first facet mirror until a null or near null value is read. The scan mirror may be commanded initially by the processor 80, according to a calibration profile stored in the database 92, to point at a particular facet mirror 16. Subsequently, the scan mirror 18 may be commanded by the processor 60, through a link between the processors 60 and 80, to change angular position until a null or near null value is read. Once a null or near null value is read, then step 160 begins.

In step 160, the processor 80 reads a first encoder value and stores the encoder value in the database 92. Then in step 162, the scan mirror 18 is commanded to point at another facet mirror 16 until a null or near null value is read. This is performed in the same manner as in step 158. When the null or near null value is read, then step 164 begins. In step 164, the processor 80 reads another encoder value and stores the encoder value in the database 92.

In step 166, if there are more facet mirror readings to be taken according to the calibration profile, then step 162 begins. If not, then 168 of FIG. 7B begins. In step 168, the processor 80 determines angles between pairs of facet mirrors 16 based on the encoder readings taken when the null or near null value was read. Then the processor 80 compares the angles or the encoder readings stored in the database 92 with expected values stored in the database 64.

Figure 7B:
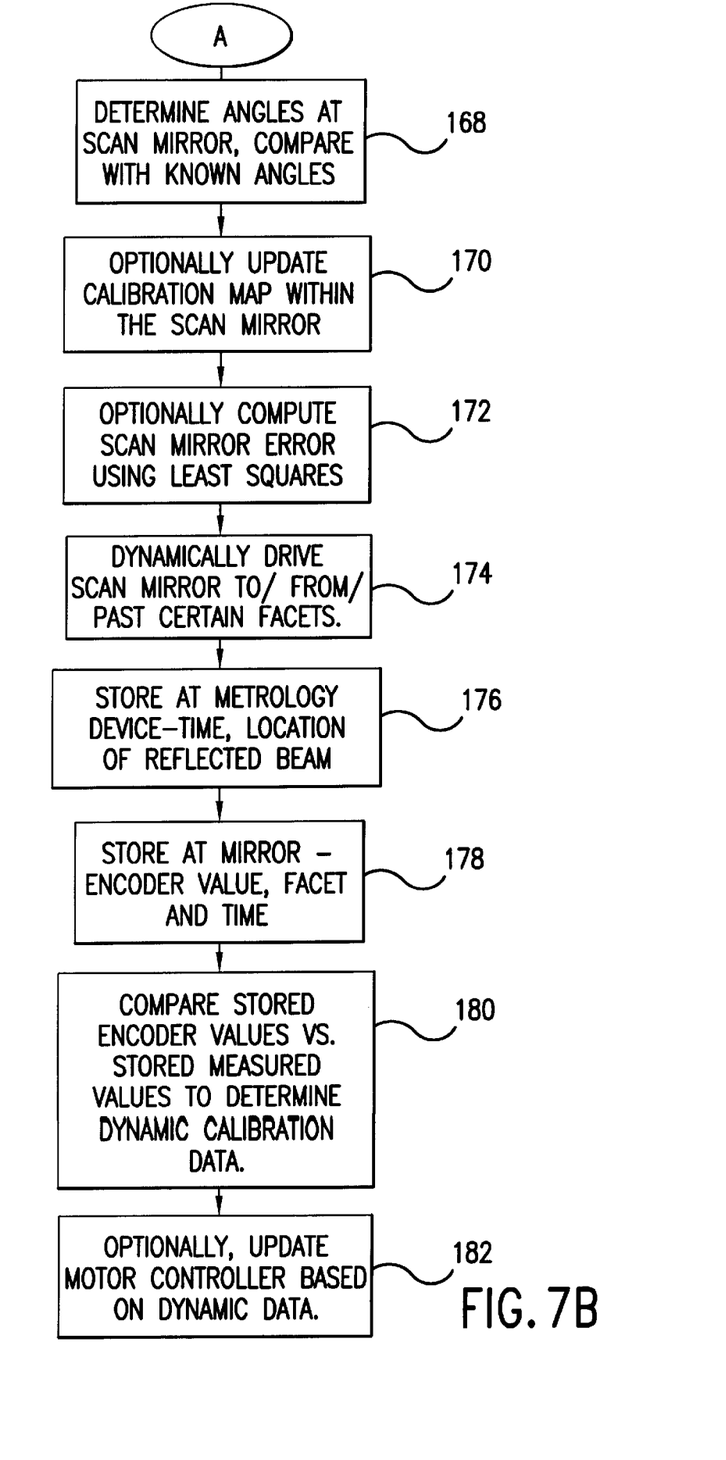

In step 170, the optical instrument optionally updates a calibration map within the scan mirror. The calibration map correlates positional readings from the position and motion sensors 86 with measured angular deflection. The calibration map may then be used by the processor 80 or the motor controller 82 to properly drive the pointing mirror 18. In step 172, the processor 60 optionally computes error in scan mirror 18 angles based on a least squares estimate of angles determined for each facet mirror 16.

In step 174, dynamic testing begins. The motor 84 drives the scan mirror to, from and past certain facet mirrors 16 under control of the processor 80.

The processor 80 commands the motor based on a calibration profile stored in the database 92. The process of dynamic testing reveals imperfections in the motor 84, the motor controller 82, and the mirror itself. For example, consider the following simple test. Command the scan mirror to move to facet 1, temporarily stop at facet 1, accelerate to facet 2, temporarily stop at facet 2 and then repeat. Rapid acceleration and deceleration causes deflection in the mirror, which is not perfectly rigid. Moreover, the motor 82 and motor controller 84 may cause some oscillation in the mirror 18 during and after stopping at facets 1 and 2. The control algorithm and angular feedback (encoder) are collectively calibrated in this manner.

In step 176, the processor 60 stores data related to the dynamic calibration test in the database 64. The data related to the dynamic calibration test may be tabulated and include the expected time that the scan mirror 18 will stop at each facet 16, the particular facet 16 at which the stop is made, and the location of the beam as measured by the angle trackers 56 and 58. The dynamic calibration test data may resemble the data stored in table #1.

In step 178, the optical instrument 12 stores a time at which the scan mirror stopped at or passed by a facet 16, the facet number and a positional, a velocity and an acceleration value read from the position and motion sensors 86.

In step 180, the processor 60 compares the calibration values stored in the database 92 of the optical instrument 12 with the calibration values stored in the database 64 of the metrology device 10 in steps 176 and 178. The comparison may show deviations in angle of deflection of the scan mirror under dynamic testing.

In step 182, the processor 80 may optionally update parameters in a calibration map used by the motor controller 82 to control the motor 84. The parameters may include the maximum allowed acceleration, deceleration or velocity.

While specific embodiments have been disclosed, it will be understood by those of ordinary skill in the art that changes may be made to those embodiments without departing from the spirit and scope of the invention.

What is claimed is:

1. A method of calibrating an optical scanning apparatus having a scan mirror, comprising the steps of:

projecting a laser beam at a scan mirror;

commanding the scan mirror to reflect the laser beam successively at a first and a second facet mirror, the first and second facet mirrors having known angles of reflection;

reflecting the laser beam substantially back onto itself at each successive facet, mirror;

determining at the scan mirror an angle between the first and the second facet mirrors; and calculating an error based on the determined angle and the known angles.

2. The method according to claim 1, further comprising the step of:

measuring an offset of the laser prior to the projecting step; and adjusting the error based on the offset.

3. The method according to claim 1, further comprising the step of:

detecting a null or near null value when the scan mirror points the laser beam at a position on each of the facet mirrors;

wherein the commanding step successively stops at each of the first and second facet mirrors when the null or near null value is detected.

4. The method according to claim 1, wherein the error value is calculated based on a least squares estimate.

5. The method according to claim 4, wherein the error value is used to update a calibration map within the scan mirror.

6. The method according to claim 1, further comprising the steps of:

dynamically driving the scan mirror between the first and the second facet mirror;

storing at correlated times location readings of the reflected beam at the metrology device and a simultaneous encoder value at the scan mirror for each corresponding location reading; and determining a dynamic error based on the difference between the respective location and encoder readings at each of the correlated times.

7. The method according to claim 6, wherein the scan mirror includes a calibration profile, specifying acceleration, maximum velocity and deceleration parameters for movement of the scan mirror.

8. The method according to claim 7, further comprising the step of updating at least one of the parameters in the calibration profile based on the dynamic error.

9. An apparatus for calibrating an optical instrument which includes a scan mirror, comprising:

a laser source for projecting a beam onto a reflective surface of a scan mirror, the scan mirror including a position sensor;

a plurality of facet mirrors angled at known angles to reflect the beam from the reflective surface substantially back onto itself; and an angle detector receiving the reflected beam and measuring a value related to a return angle of the beam.

10. The apparatus according to claim 9, further comprising a processor, coupled to the angle detector and the scan mirror, the processor commanding the scan mirror to point the beam at a predetermined facet and commanding the scan mirror to move until the angle detector reads a null or near null value.

11. The apparatus according to claim 10, wherein the optical instrument further comprises:

an encoder coupled to the scan mirror for measuring position values corresponding to positions of the scan mirror; and a database coupled to the encoder for storing position values at each position where the angle detector reads a null or near null value.

12. The apparatus according to claim 10, wherein the processor determines an error based on the position values and the known angles.

13. The apparatus according to claim 12, wherein the processor updates a calibration map based on the error.

14. The apparatus according to claim 9, further comprising a processor, coupled to the angle detector and the scan mirror, the processor issuing commands to the scan mirror to dynamically move the beam to and from predetermined facet mirrors and commanding the angle detector to read angle values at predetermined times.

15. The apparatus according to claim 14, wherein the processor determines dynamic calibration data based on the commands and the angle values.

16. The apparatus according to claim 9, further comprising:

a housing;

wherein the laser source and the angle detector are mounted to the housing and the plurality of facet mirrors are each mounted to the housing using a three ball kinematic mount.

17. The apparatus according to claim 9, further comprising an optical switch between the laser source and the reflective surface which selectively transmits the beam.

18. An apparatus for calibrating an optical instrument which includes a scan mirror, comprising:

laser means for projecting a beam onto a reflective surface of a scan mirror, the scan mirror including a position sensor;

an assembly of facet mirrors angled at known angles to reflect the beam from the reflective surface substantially back onto itself; and detecting means for receiving the reflected beam and measuring a value related to a return angle of the beam.

19. The apparatus according to claim 18, further comprising a processor, coupled to the detecting means and the scan mirror, the processor commanding the scan mirror to point the beam at a predetermined facet and commanding the scan mirror to move until the detecting means reads a null or near null value.

20. The apparatus according to claim 18, wherein the optical instrument further comprises:

encoding means coupled to the scan mirror for measuring position values corresponding to positions of the scan mirror; and database means coupled to the encoder for storing position values at each position where the angle detector reads a null or near null value.

* * * * *